(12) United States Patent
Kawano

(10) Patent No.: US 11,374,793 B2
(45) Date of Patent: Jun. 28, 2022

(54) NETWORK SEGMENT ALLOCATION SYSTEM AND METHOD

(71) Applicant: NIPPON TELEGRAPH AND TELEPHONE CORPORATION, Tokyo (JP)

(72) Inventor: Shinya Kawano, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/268,427

(22) PCT Filed: Aug. 8, 2019

(86) PCT No.: PCT/JP2019/031400
§ 371 (c)(1),
(2) Date: Feb. 12, 2021

(87) PCT Pub. No.: WO2020/036117
PCT Pub. Date: Feb. 20, 2020

(65) Prior Publication Data
US 2021/0351957 A1 Nov. 11, 2021

(30) Foreign Application Priority Data
Aug. 15, 2018 (JP) .............................. JP2018-152994

(51) Int. Cl.
*H04L 12/46* (2006.01)
*H04L 12/28* (2006.01)
*H04L 9/40* (2022.01)

(52) U.S. Cl.
CPC ...... *H04L 12/4679* (2013.01); *H04L 12/2856* (2013.01); *H04L 12/4633* (2013.01); *H04L 12/4641* (2013.01); *H04L 63/0823* (2013.01)

(58) Field of Classification Search
CPC ....... H04L 12/2856–2898; H04L 12/46; H04L 12/4641–4695
See application file for complete search history.

(56) References Cited

U.S. PATENT DOCUMENTS 6,823,462 B1 * 11/2004 Cheng ................. H04L 63/0272
709/227
6,982,984 B1 * 1/2006 Asayesh ............. H04L 12/4641
370/230

(Continued)

OTHER PUBLICATIONS

NEC (2018) "vCPE virtualized Customer Premises Equipment," [online] Accessed on Jul. 30, 2018(Reading Day) website: http://jpn.nec.com/tcs/vCPE/index.html.

(Continued)

*Primary Examiner* — David R Lazaro
*Assistant Examiner* — Julian Chang

(57) ABSTRACT

When a subscriber terminal (100A) connects to the other party vCPE (310B), a communication system (1) determines whether a connection between the other party terminal (100B) and the other party vCPE (310B) and a connection between the subscriber terminal (100A) and the other party vCPE (310B) are to be established through the same network segment based on connection permission conditions of the other party vCPE (310B) and the subscriber terminal (100A), and the other party vCPE (310B) allocates a network segment, which is the same as or different from a network segment allocated to the other party terminal (100B), to the subscriber terminal (100A) according to the determination.

20 Claims, 21 Drawing Sheets

(56) References Cited

U.S. PATENT DOCUMENTS

| | | | | |
|---|---|---|---|---|
| 7,054,321 | B1* | 5/2006 | Nanji | H04L 12/2856 370/352 |
| 8,514,828 | B1* | 8/2013 | Verma | H04L 12/4633 370/338 |
| 8,675,664 | B1* | 3/2014 | Kamath | H04L 12/4658 370/395.53 |
| 2005/0018605 | A1* | 1/2005 | Foote | H04L 12/4641 370/230 |
| 2005/0195751 | A1* | 9/2005 | Jones | H04L 12/2859 370/254 |
| 2007/0022469 | A1* | 1/2007 | Cooper | H04L 9/3263 726/3 |
| 2009/0034431 | A1* | 2/2009 | Nagarajan | H04L 63/164 370/254 |
| 2013/0173797 | A1* | 7/2013 | Poirer | H04L 12/4641 709/225 |
| 2014/0056290 | A1* | 2/2014 | Pazhyannur | H04L 12/4625 370/338 |
| 2014/0123270 | A1* | 5/2014 | Liu | H04L 12/467 726/15 |
| 2016/0241515 | A1* | 8/2016 | Pai | H04W 48/08 |
| 2016/0315808 | A1* | 10/2016 | Saavedra | H04L 67/42 |
| 2017/0085529 | A1* | 3/2017 | Finkelstein | H04L 63/162 |
| 2017/0118127 | A1* | 4/2017 | Finkelstein | H04L 47/6275 |
| 2017/0118179 | A1* | 4/2017 | Onno | H04L 63/08 |
| 2017/0208039 | A1* | 7/2017 | Godfrey | H04L 63/029 |
| 2017/0244577 | A1* | 8/2017 | Patrick | H04L 12/4641 |
| 2017/0272274 | A1* | 9/2017 | Onno | H04L 45/02 |
| 2017/0289291 | A1* | 10/2017 | S | H04L 12/4633 |
| 2018/0176177 | A1* | 6/2018 | Bichot | H04L 61/6004 |
| 2019/0182155 | A1* | 6/2019 | Chang | H04L 61/251 |
| 2020/0412608 | A1* | 12/2020 | Dunbar | H04L 12/66 |
| 2021/0105227 | A1* | 4/2021 | Kawano | H04L 47/76 |
| 2021/0168582 | A1* | 6/2021 | Ceccarelli | H04W 40/34 |
| 2021/0297276 | A1* | 9/2021 | Homma | H04L 12/2898 |

OTHER PUBLICATIONS

Juniper Networks (2018) "Enterprise Managed Services Offerings: Controlling End Users with Virtual CPE," [online] Accessed on ccessed on Jul. 30, 2018(Reading Day) website: https://www.juniper.net/jp/jp/solutions/nfv/vCPE/.

Kouno et al. (2018) "Location-Free Network Connectivity Service System Using vCPE," IEICE Technical Report 118 (6): pp. 19-24.

ALAXALA Networks Corporation (2005) "Dynamic VLAN mode," [online] Accessed on Jul. 30, 2018(Reading Day) website: https://www.alaxala.eom/jp/techinfo/archive/manual/AX2400S/HTML/11_7/CFGUIDE2/0199.HTM#ID00707.

* cited by examiner

| VLAN NUMBER | EJECTION STATE | CONNECTING SUBSCRIBER ID | CONNECTING TERMINAL | PERMITTED VLAN |
|---|---|---|---|---|
| 1 | 1 (ISSUED) | ID1 | IP addr 1 | 2 |
| 2 | 1 | ID2 | IP addr 2<br>IP addr 3 | 1 |
| 3 | 0 (UNISSUED) | 0 | 0 | 0 |
| ⋮ | ⋮ | ⋮ | ⋮ | ⋮ |

Fig. 7

| TERMINAL MAC ADDRESS | ACCOMMODATING vCPE | SUBSCRIBER ID | CONNECTION-PERMITTED vCPE |
|---|---|---|---|
| MAC addr 1 | IP addr 1 | ID1 | IP addr 2 |
| MAC addr 2 | IP addr 1 | ID1 | 0 |
| MAC addr 3 | IP addr 2 | ID2 | IP addr 1 |
| ⋮ | ⋮ | ⋮ | ⋮ |

Fig. 9

| vCPE IP ADDRESS | CONNECTION-PERMITTED SUBSCRIBER |
|---|---|
| IP addr 1 | ID1, ID2 |
| IP addr 2 | ID1 |
| IP addr 3 | ID3 |
| ⋮ | ⋮ |

Fig. 10

| vCPE IP ADDRESS | PRESENCE/ABSENCE OF OUT-OF-HOME CONNECTION | WHETHER TO PERMIT CONNECTIONS FROM OTHER vCPE |
|---|---|---|
| IP addr 1 | PRESENT (1) | NOT PERMIT (0) |
| IP addr 2 | ABSENT (0) | NOT PERMIT (0) |
| IP addr 3 | PRESENT (1) | PERMIT (1) |
| ⋮ | ⋮ | ⋮ |

Fig. 11

| PORT NUMBER | VLAN NUMBER | MAC ADDRESS |
|---|---|---|
| 1 | 1 | aa:bb:cc:dd:ee:ff |
| 2 | 2 | 11:22:33:44:55:66 |
| 3 | 0 | 0 |
| ⋮ | ⋮ | ⋮ |

Fig. 14

NETWORK SEGMENT ALLOCATION SYSTEM AND METHOD

CROSS-REFERENCE TO RELATED APPLICATIONS

This application is a U.S. 371 Application of International Patent Application No. PCT/JP2019/031400, filed on 8 Aug. 2019, which application claims priority to and the benefit of JP Application No. 2018-152994, filed on 15 Aug. 2018, the disclosures of which are hereby incorporated herein by reference in their entireties.

TECHNICAL FIELD

The present invention relates to a communication system and a communication method.

BACKGROUND ART

In order for a terminal inside a home to connect to the Internet, the terminal typically connects to a line of a communication carrier before connecting to the Internet. More flexible connection services are required for connection to lines of communication carriers.

Normally, when a terminal of a subscriber connects to a line of a communication carrier, the communication carrier performs line authentication and the terminal is connected to the line if the authentication is successful. When line authentication is performed, service conditions of each subscriber are checked and the checked service conditions are applied.

Here, virtual Customer Premise Equipment (vCPE) technologies, which partially deploy functions such as Home Gate Way (HGW) on a network to achieve flexible and timely service provision by communication carriers, have been proposed and put into practical use (see, for example, Non Patent Literatures 1 and 2). Among them, a vCPE technology has been applied as a method that enables services to be flexibly added and deleted.

Further, methods which utilize vCPE to achieve connection to a home network from outside the home such that the home network can be easily used from outside the home have been proposed (see Non Patent Literatures 3 and 4). In these methods, vCPE outside the home connects to vCPE inside the home and network address translation (NAT) functions in the vCPE is used to perform transfer such that the pieces of vCPE are linked. According to these methods, a subscriber can use the same service outside the home as in the home without complicated settings.

CITATION LIST

Non Patent Literature

Non Patent Literature 1: NEC, vCPE virtualized Customer Premises Equipment, [online], [retrieved Jul. 30, 2018], Internet jpn.nec.com/tcs/vCPE/index.html Non Patent Literature 2: JUNIPER, Virtualized CPE-Juniper Networks, [online], [retrieved Jul. 30, 2018], Internet juniper-.net/jp/jp/solutions/nfv/vCPE/ Non Patent Literature 3: Kawano, Miyamoto, Kimura, Homma, Tsuchiya, Okada, Sato, "Location-Free Network Connectivity Service System Using vCPE", IEICE Technical Report, vol. 118, no. 6, pp. 19-24, Apr. 2018. Non Patent Literature 4: ALAXALA, Dynamic VLAN Mode, [online], [retrieved Jul. 30, 2018], Internet alaxala.com/jp/techinfo/archive/manual/AX2400S/HTML/11_7/CFGUIDE2/01 99.HTM#ID00707.

SUMMARY OF THE INVENTION

Technical Problem

In the technology of Non Patent Literature 3, vCPE outside the home (the other party vCPE) identifies vCPE to which the subscriber terminal connected to the other party vCPE belongs (subscriber vCPE). Therefore, in the technology of Non Patent Literature 3, a network segment established up to the other party vCPE is common to the subscriber terminal and the other party terminal which originally connects to the other party vCPE.

Here, there is a demand for each network provider to appropriately control the connectivity between the subscriber terminal and the other party terminal. Specifically, the user of the connecting subscriber terminal desires to separate the network segment from the other party terminal because there is a possibility that a terminal or the like on which malicious software is installed has been connected to the home network of the other party to which the subscriber terminal connects. On the other hand, the user of the other party terminal on the side to which the subscriber terminal connects desires to separate the network segment from the subscriber terminal because there is a possibility that the subscriber terminal has vulnerability or malicious software has been installed on the subscriber terminal.

However, because the network segment established up to the other party vCPE is common to the subscriber terminal and the other party terminal which originally connects to the other party vCPE, it is difficult to separate the network segment for the terminals.

The present invention has been made in view of the foregoing and it is an object of the present invention to provide a communication system and a communication method which can flexibly change the connection relationship between a subscriber terminal and the other party terminal which connects to the other party vCPE when the subscriber terminal connects to the other party vCPE.

Means for Solving the Problem

To solve the problems and achieve the object, the present invention provides a communication system including first virtual Customer Premise Equipment (vCPE) to which a first terminal belongs, second vCPE to which a second terminal connects, and an authentication server, the communication system includes a determination unit configured to determine, when the first terminal connects to the second vCPE, whether a connection between the second terminal and the second vCPE and a connection between the first terminal and the second vCPE are to be established through an identical network segment based on connection permission conditions of the second vCPE and the first terminal, and the second vCPE includes a connection unit configured to establish, if the first terminal is registered in the authentication server, a tunnel connection with the first vCPE based on an address of the first vCPE notified by the authentication server, and an allocation unit configured to allocate, if a connection between the second terminal and the second vCPE and a connection between the first terminal and the second vCPE are determined to establish through different network segment, a network segment different from a network segment allocated to the second terminal to the first terminal and allocate, if a connection between the second terminal and the second vCPE and a connection between the first terminal and the second vCPE are determined to establish through an identical network segment, a network segment allocated to the second terminal to the first terminal.

Effects of the Invention

According to the present invention, it is possible to flexibly change the connection relationship between a subscriber terminal and the other party terminal which connects to the other party vCPE when the subscriber terminal connects to the other party vCPE.

BRIEF DESCRIPTION OF DRAWINGS

FIG. 7 is a diagram showing an example of a data structure of a VLAN issuance information table.

FIG. 9 is a diagram showing an example of a data structure of a terminal information table.

FIG. 10 is a diagram showing an example of a data structure of a vCPE management table.

FIG. 11 is a diagram showing a data structure of a cooperation execution presence/absence table.

FIG. 14 is a diagram showing an example of a data structure of a VLAN management table.

DESCRIPTION OF EMBODIMENTS

Hereinafter, embodiments of the present invention will be described in detail with reference to the drawings. The present invention is not limited to the embodiments. In the description of the drawings, the same parts are denoted by the same reference signs.

Embodiment

Figure 1:
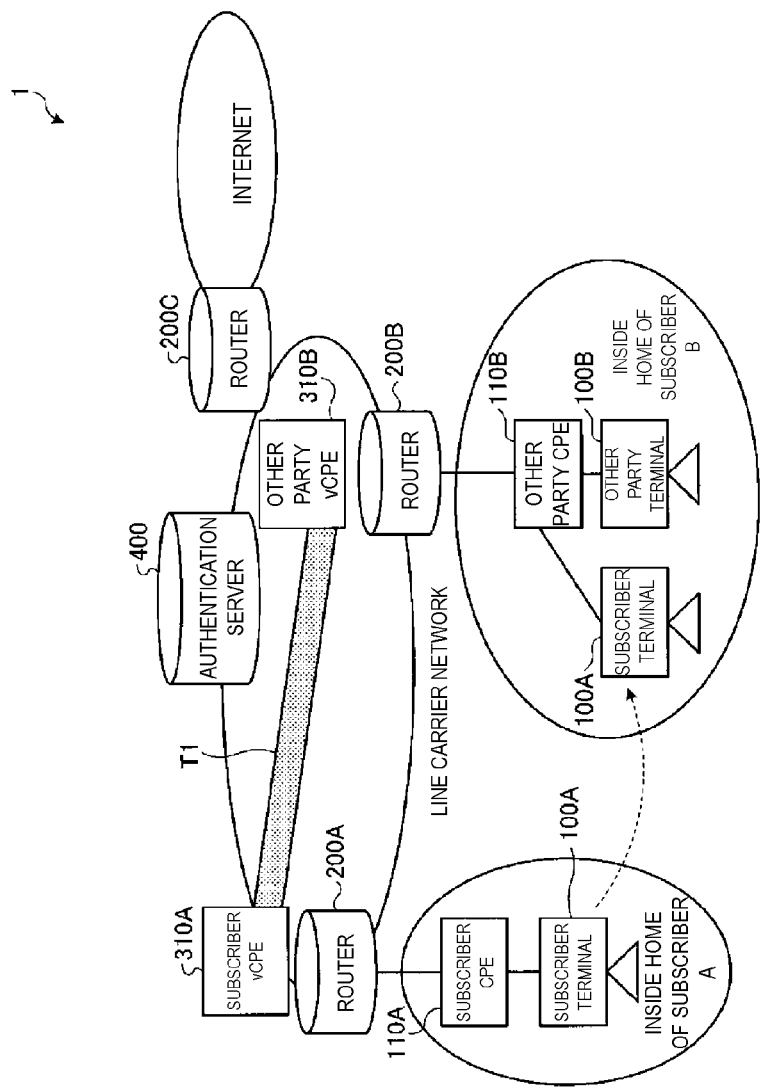
FIG. 1 is a diagram illustrating an example of a configuration of a communication system according to an embodiment.

An embodiment of the present invention will be described. FIG. 1 is a diagram illustrating an example of a configuration of a communication system according to an embodiment.

As illustrated in FIG. 1, a communication system 1 according to the embodiment is configured such that a terminal 100A of a home network of a subscriber A or a terminal 100B of a home network of a subscriber B connects to the Internet via a line carrier network.

The home network of the subscriber A has a terminal 100A and a CPE 110A. The home network of the subscriber A is connected to the line carrier network via a router 200A. The home network of the subscriber B includes a terminal 100B and a CPE 110B. The home network of the subscriber A is connected to the line carrier network via a router 200B.

The line carrier network is provided with an authentication server 400, vCPE 310A to which the terminal 100A belongs, and vCPE 310B to which the terminal 100B belongs. The vCPE 310A and 310B actually operate in a server apparatus (not illustrated). Hereinafter, the terminals 100A and 100B may be collectively referred to as terminals 100. The vCPE 310A and vCPE 310B may be collectively referred to as vCPE 310. The CPE 110A and 110B may be collectively referred to as CPE 110.

The authentication server 400 registers terminals 100 and stores sets of the terminals 100 and vCPE to which the terminals 100 belong. The authentication server 400 stores connection permission conditions of each piece of vCPE 310 and connection permission conditions of each terminal 100. When receiving an inquiry from a terminal 100 via vCPE 310, the authentication server 400 registers the terminal 100 if the terminal 100 has not been registered. When receiving an inquiry from a terminal 100 via vCPE 310, the authentication server also performs an authentication procedure for checking registration information of the terminal 100.

The vCPE 310 has functions such as issuing an address when the terminal 100 connects to it and terminating a tunnel from the CPE 110. The CPE 110 has a function of connecting a tunnel to the vCPE 310.

The present embodiment will be described for the case where the terminal 100A of the subscriber A connects to the home network of the subscriber B who is the other party. In this case, the terminal 100A connects to the vCPE 310A via a tunnel T1 between the vCPE 310B to which the terminal 100B of the subscriber B belongs and the vCPE 310A to which the terminal 100A of the subscriber A belongs.

Thus, hereinafter, the terminal 100A of the subscriber A will be referred to as a subscriber terminal 100A (a first terminal), the CPE 110A at the site of the subscriber A will be referred to as subscriber CPE 110A, and the vCPE 310A at the site of the subscriber A will be referred to as subscriber vCPE 310A (first vCPE). Also, the terminal 100B of the subscriber B will be referred to as the other party terminal 100B (a second terminal), the CPE 110B at the site of the subscriber B will be referred to as the other party CPE 110B, and the vCPE 310B at the site of the subscriber B will be referred to the other party vCPE (second vCPE).

In the present embodiment, when the subscriber terminal 100A connects to the other party vCPE 310B, the authentication server 400 refers to the connection permission conditions and performs the following determination according to the connection permission content of the subscriber terminal 100A and the connection permission content of the other party vCPE 310B. The determination mentioned here is as to whether a connection between the other party terminal 100B and the other party vCPE 310B and a connection between the subscriber terminal 100A and the other party vCPE 310B are to be established through the same network segment. In the communication system 1, the other party vCPE 310B sets a network segment according to this determination, thereby enabling change of the connection relationship between the subscriber terminal 100A that connects to the other party vCPE 310B and the other party terminal 100B.

Flow of Communication Processing

Figure 2:
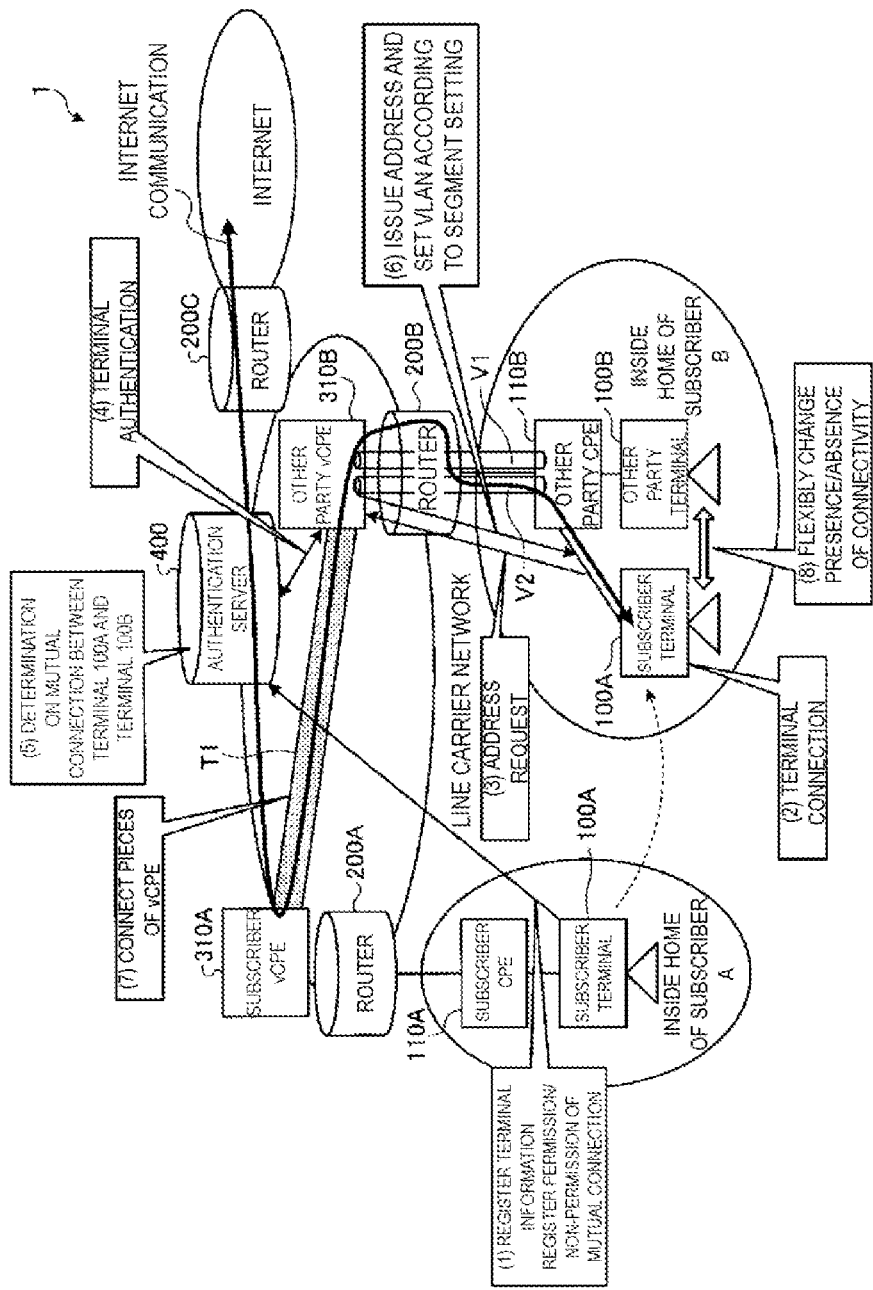
FIG. 2 is a diagram for explaining a flow of communication processing in the communication system illustrated in FIG. 1.

Next, a flow of communication processing in the communication system 1 will be described. FIG. 2 is a diagram for explaining a flow of communication processing in the communication system 1 illustrated in FIG. 1. A flow of processing up to setting a network segment between the subscriber terminal 100A that connects to the other party vCPE 310B and the other party terminal 100B will be described with reference to FIG. 2.

As illustrated in FIG. 2, first, the authentication server 400 has terminal information (for example, Media Access Control (MAC) addresses) of terminals of subscribers and identification information (for example, Internet Protocol (IP) addresses) of the pieces of vCPE to which the terminals of the subscribers belong. When terminal information of a subscriber terminal 100A of a subscriber A is registered in the authentication server 400, permission/non-permission of mutual connection of the subscriber terminal 100A is also registered in the same (see (1) in FIG. 2). An example of a permission registration method will be described. For example, the authentication server 400 automatically registers non-permission by default when registering terminal information. When the subscriber desires to permit connections from outside the home, the subscriber sets permission through a Web interface or API.

The subscriber terminal 100A of the subscriber A connects to the home network of the subscriber B (outside the home) (see (2) in FIG. 2). At this time, the subscriber terminal 100A issues an address request to the other party vCPE 310B (see (3) in FIG. 2). The other party vCPE 310B requests the authentication server to authenticate the subscriber terminal 100A (see (4) in FIG. 2).

The authentication server 400 authenticates the subscriber terminal 100A in response to the authentication request (see (4) in FIG. 2). Further, the authentication server 400 refers to the connection permission conditions to perform determination on mutual connection between the subscriber terminal 100A and the other party terminal 100B (see (5) in FIG. 2). The authentication server 400 sets network segments to be applied to both a connection between the other party terminal 100B and the other party vCPE 310B and a connection between the subscriber terminal 100A and the other party vCPE 310B (see (5) in FIG. 2). That is, the authentication server 400 sets a connection between the other party terminal 100B and the other party vCPE 310B and a connection between the subscriber terminal 100A and the other party vCPE 310B in the same network segment depending on the connection permission conditions. Alternatively, the authentication server 400 sets a connection between the other party terminal 100B and the other party vCPE 310B and a connection between the subscriber terminal 100A and the other party vCPE 310B in different network segments depending on the connection permission conditions.

Then, the other party vCPE 310B acquires the IP address of the subscriber vCPE 310A to which the subscriber terminal 100A belongs from the authentication server 400 (see (6) in FIG. 2) and establishes a connection with the subscriber vCPE 310A through a tunnel T1 (L3 tunnel) (see (7) in FIG. 2). Then, the other party vCPE 310B is set to transfer traffic from the subscriber terminal 100A to the tunnel T1.

Figure 3:
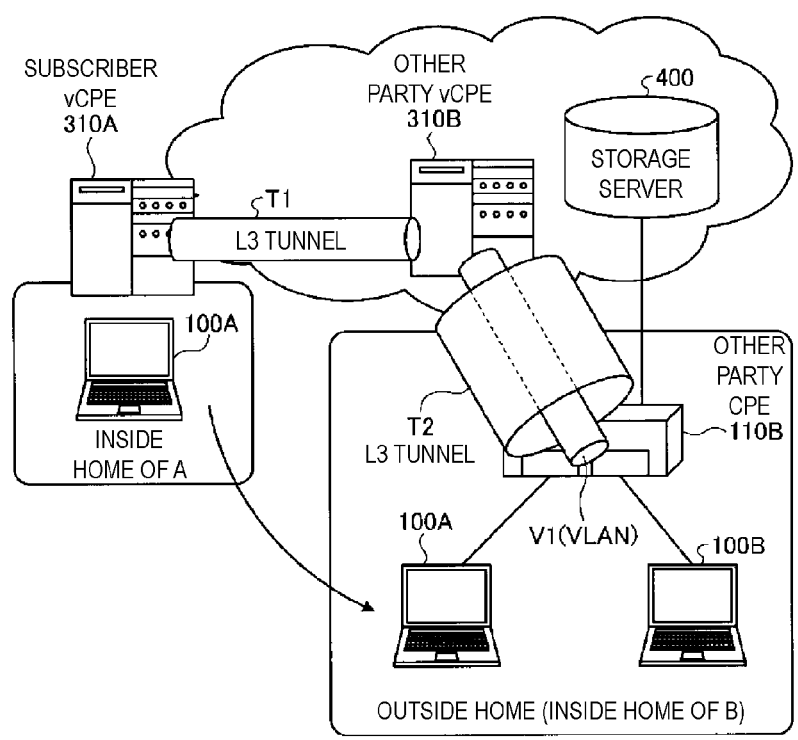
FIG. 3 is a diagram for explaining network segment allocation.
Figure 4:
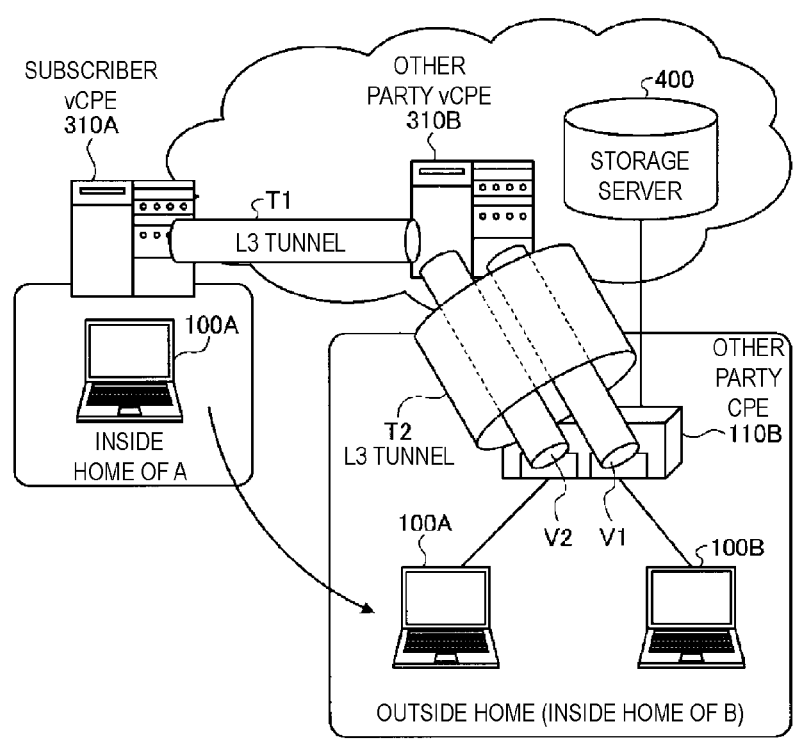
FIG. 4 is a diagram for explaining network segment allocation.

Subsequently, the other party vCPE 310B performs Virtual Local Area Network (VLAN) setting according to the network segment setting performed by the authentication server 400 (see (6) in FIG. 2). FIGS. 3 and 4 are diagrams for explaining network segment allocation. FIGS. 3 and 4 illustrate only main parts of the communication system 1.

More specifically, the case where a connection between the other party terminal 100B and the other party vCPE 310B and a connection between the subscriber terminal 100A and the other party vCPE 310B are set to be established through the same network segment will be described here. In this case, the other party vCPE 310B allocates a VLAN (V1 in FIGS. 2 and 3) which has been allocated to the other party terminal 100B to the subscriber terminal 100A. This allows the subscriber terminal 100A and the other party terminal 100B to be connected through the same VLAN.

Further, the case where a connection between the other party terminal 100B and the other party vCPE 310B and a connection between the subscriber terminal 100A and the other party vCPE 310B are set to be established through different network segments will be described here. In this case, the vCPE 310B allocates to the subscriber terminal 100A a VLAN (V2 in FIGS. 2 and 4) different from the VLAN (V1 in FIGS. 2 and 4) that has been allocated to the other party terminal 100B. This allows the subscriber terminal 100A and the other party terminal 100B to be separated from each other.

Figure 5:
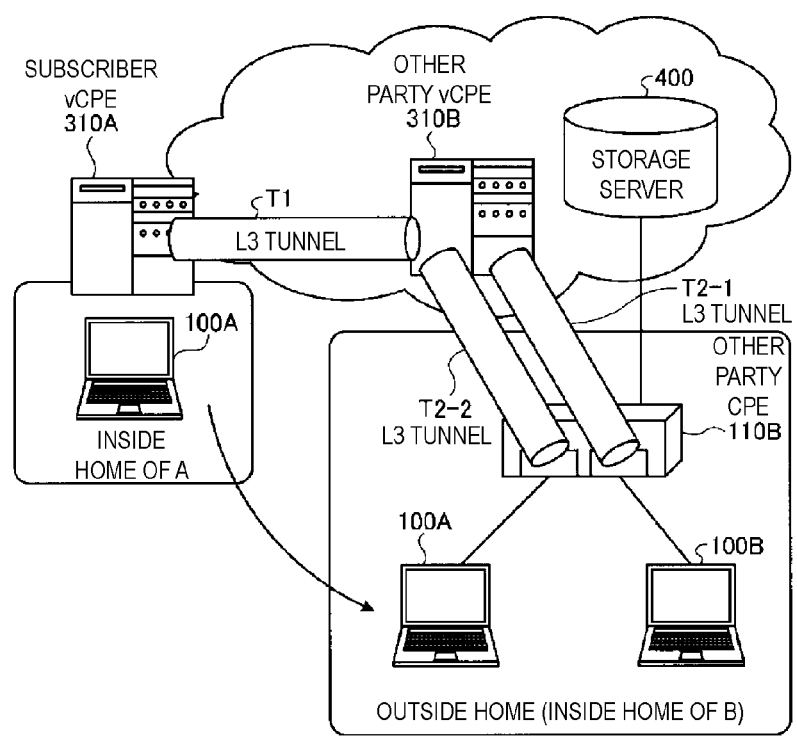
FIG. 5 is a diagram for explaining another example of network segment allocation.

Note that separation between the subscriber terminal 100A and the other party terminal 100B can also be implemented through setting for L2 forwarding of the other party CPE 110B without using a VLAN. FIG. 5 is a diagram for explaining another example of network segment allocation. For example, when an LE tunnel T2-1 has been allocated to the other party terminal 100B, the vCPE 310B may allocate an L3 tunnel T2-2 different from the tunnel T2-1 to the subscriber terminal 100A, thereby separating the subscriber terminal 100A and the other party terminal 100B from each other.

By executing such processing, the communication system 1 can flexibly change the connection relationship (the presence or absence of connectivity) between the subscriber terminal 100A and the other party terminal 100B when the subscriber terminal 100A connects to the other party vCPE 310B (see (8) in FIG. 2).

Configuration of Other Party vCPE

Figure 6:
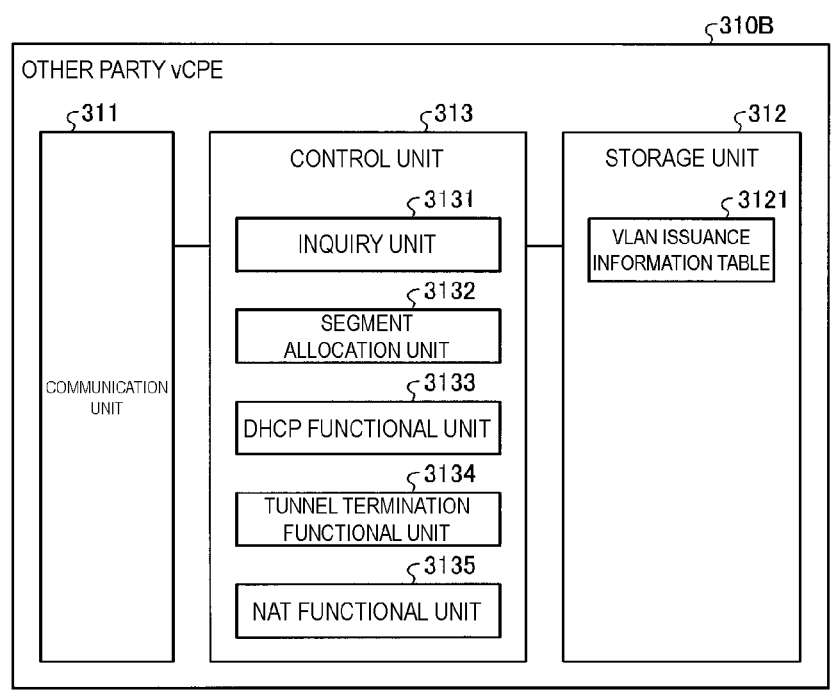
FIG. 6 is a diagram illustrating an example of a configuration of the other party VCPE illustrated in FIG. 1.

Next, the configurations of devices constituting the communication system 1 will be described. First, the configuration of the other party vCPE 310B will be described. FIG. 6 is a diagram illustrating an example of the configuration of the other party VCPE 310B illustrated in FIG. 1. As illustrated in FIG. 6, the other party vCPE 310B includes a communication unit 311, a storage unit 312, and a control unit 313. The vCPE 310 operates in a real server apparatus as described above.

The communication unit 311 transmits and receives various types of information to and from other devices connected thereto via a network or the like. The communication unit 311 is implemented by a communication interface such as a network interface card (NIC) in a running server apparatus and performs communication between the control unit 313 (which will be described below) and other devices via a telecommunication line such as a Local Area Network (LAN) or the Internet.

The storage unit 312 is implemented by a semiconductor memory device such as a Random Access Memory (RAM) or a flash memory or a storage device such as a hard disk or an optical disc in the running server apparatus. The storage unit 312 stores a processing program for operating the other party vCPE 310B, data used during execution of the processing program, and the like. The storage unit 312 has a VLAN issuance information table 3121.

The VLAN issuance information table 3121 shows the status of VLAN issuance by the other party vCPE 310B. FIG. 7 is a diagram showing an example of a data structure of the VLAN issuance information table 3121.

As shown in FIG. 7, the VLAN issuance information table 3121 has items of a VLAN number, an issuance state, a connecting subscriber ID, the IP address of a connecting terminal, and a permitted VLAN. For example, the issuance state of a VLAN with a VLAN number of "1" has been updated to "1" because the VLAN with the VLAN number "1" has already been allocated to a connecting terminal with "IP addr 1". Further, the issuance state of a VLAN with a VLAN number of "3" remains at "0" because the VLAN with the VLAN number "3" has not yet been issued. The VLAN issuance information table 3121 is updated according to VLAN allocation of a segment allocation unit 3132 (which will be described below).

The control unit 313 controls the entirety of the other party vCPE 310B. The control unit 313 performs various processing according to a program that defines the procedures of various processing and required data. For example, the control unit 313 is an electronic circuit such as a Central Processing Unit (CPU) or a Micro Processing Unit (MPU) in the running server apparatus. The control unit 313 functions as various processing units as various programs run.

The control unit 313 includes an inquiry unit 3131, the segment allocation unit 3132 (an allocation unit), a DHCP functional unit 3133 that performs IP address distribution, a tunnel termination functional unit 3134 (a connection unit), and an NAT functional unit 3135 that performs NAT processing.

The inquiry unit 3131 inquires of the authentication server 400 about whether the subscriber terminal 100A has been registered. The inquiry unit 3131 receives the IP address of the subscriber vCPE 310A and the following setting instruction from the authentication server 400 in response to the inquiry about whether the subscriber terminal 100A has been registered. The setting instruction mentioned here is an instruction to set network segments for a connection between the other party terminal 100B and the other party vCPE 310B and a connection between the subscriber terminal 100A and the other party vCPE 310B.

The segment allocation unit 3132 allocates a VLAN (network segment) to the subscriber terminal 100A that connects to the other party vCPE 310B according to the network segment setting instruction from the authentication server 400.

For example, the segment allocation unit 3132 allocates a VLAN allocated to the other party terminal 100B to the subscriber terminal 100A when a connection between the other party terminal 100B and the other party vCPE 310B and a connection between the subscriber terminal 100A and the other party vCPE 310B are set to establish through the same network segment.

The segment allocation unit 3132 allocates a VLAN different from the VLAN allocated to the other party terminal 100B to the subscriber terminal 100A when a connection between the other party terminal 100B and the other party vCPE 310B and a connection between the subscriber terminal 100A and the other party vCPE 310B are set to establish through different network segments. The segment allocation unit 3132 newly sets a VLAN between the other party vCPE 310B and the other party CPE 110B. The segment allocation unit 3132 may have a function of allocating tunnels according to the terminals 100.

The tunnel termination functional unit 3134 performs tunnel termination. The tunnel termination functional unit 3134 establishes tunnel connections from a plurality of sites. When the subscriber terminal 100A has been registered in the authentication server 400, the tunnel termination functional unit 3134 establishes a tunnel connection with the subscriber vCPE 310A based on the address of the subscriber vCPE 310A of which the authentication server 400 has notified.

The subscriber vCPE 310A may have the same configuration as the other party vCPE 310B. It is sufficient for the subscriber vCPE 310A to have at least a function of establishing tunnel connections from a plurality of sites and a function of allocating tunnels according to the terminals 100.

Configuration of Authentication Server

Figure 8:
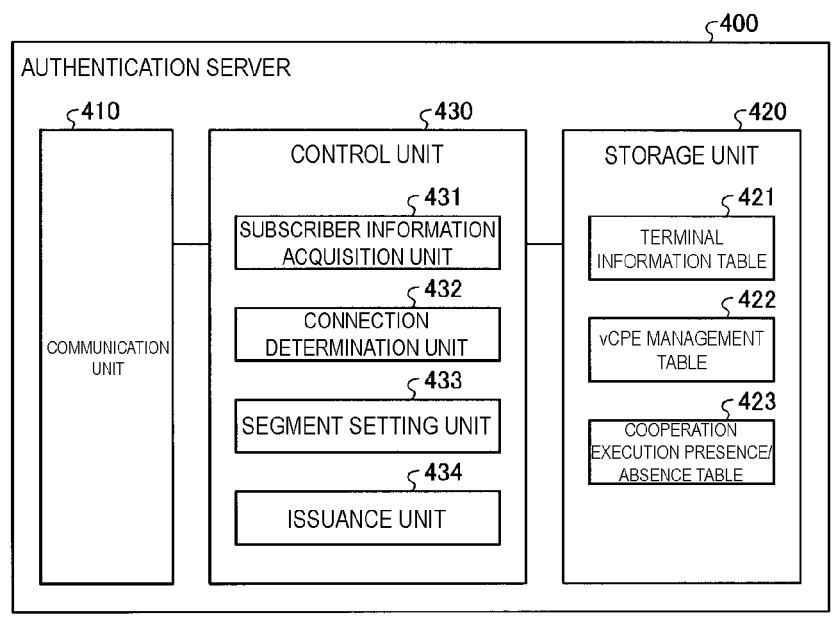
FIG. 8 is a diagram illustrating an example of a configuration of an authentication server illustrated in FIG. 1.

Next, the authentication server 400 will be described. FIG. 8 is a diagram illustrating an example of the configuration of the authentication server 400 illustrated in FIG. 1. As illustrated in FIG. 8, the authentication server 400 includes a communication unit 410, a storage unit 420, and a control unit 430.

The communication unit 410 is implemented by a communication interface such as an NIC and performs communication between the control unit 420 (which will be described below) and other devices via a telecommunication line such as a LAN or the Internet.

The storage unit 420 is implemented by a semiconductor memory device such as a RAM or a flash memory or a storage device such as a hard disk or an optical disc and stores a processing program for operating the authentication server 400, data used during execution of the processing program, and the like. The storage unit 420 has a terminal information table 421, a vCPE management table 422, and a cooperation execution presence/absence table 423.

The terminal information table 421 is information indicating connection permission conditions of each terminal 100. The terminal information table 421 associates the MAC address of each terminal 100, identification information of vCPE 310 that accommodates the terminal 100, the subscriber ID of the terminal 100, and identification information of vCPE 310 from which connections are permitted by the terminal 100 with each other. The connection permission conditions of a terminal 100 are preset by a subscriber who uses the terminal 100 via a Web interface (for example, a Simple Object Access Protocol (SOAP)).

FIG. 9 is a diagram showing an example of a data structure of the terminal information table 421. As shown in FIG. 9, the terminal information table 421 has items of MAC address of the terminal 100, the IP address of the vCPE 310 that accommodates the terminal 100, the subscriber ID of the terminal 100, and the IP address of the vCPE 310 from which connections are permitted by the terminal 100.

For example, a terminal 100 with a MAC address "MAC addr 1" has vCPE 310 with an IP address "IP addr 1" as subscriber vCPE 310A that accommodates the terminal 100. This terminal 100 with "MAC addr 1" has a subscriber ID "ID 1" and permits connections from vCPE 310 with an IP address "IP addr 2". A terminal 100 with a MAC address "MAC addr 2" has the same subscriber vCPE 310A and subscriber ID as those of the terminal 100 with the MAC address "MAC addr 1", but has "0" in the connection-permitted vCPE field, such that the vCPE 310 from which connections are permitted by the terminal 100 has not been set.

The vCPE management table 422 is information indicating connection permission conditions of each piece of vCPE 310. The vCPE management table 422 associates identification information of each piece of vCPE 310 with subscriber IDs from which connections are permitted by the vCPE 310. The connection permission conditions of vCPE 310 are preset by an administrator or the like who manages the vCPE 310 via a Web interface (for example, an SOAP).

FIG. 10 is a diagram showing an example of a data structure of the vCPE management table 422. As shown in FIG. 10, the vCPE management table 422 has items of the IP address of the vCPE 310 and subscriber IDs from which connections are permitted by the vCPE 310. For example, vCPE 310 with an IP address "IP addr 1" permits connections from subscriber IDs "ID 1" and "ID 2".

Next, the cooperation execution presence/absence table 423 will be described. FIG. 11 is a diagram showing a data structure of the cooperation execution presence/absence table 423. The cooperation execution presence/absence table 423 indicates the IP address of each piece of vCPE 310, the presence/absence of an out-of-home connection of a terminal 100 accommodated in the vCPE 310, and information as to whether to permit the other vCPE 310 to connect to the vCPE 310.

The authentication server 400 stores the cooperation execution presence/absence table 423 only when subscribers set the presence/absence of connection to the home from outside the home or connection to the other vCPE from the home via a registration menu upon registering as new subscribers. For example, the authentication server 400 does not store the cooperation execution presence/absence table 423 when it is determined that any vCPE 310 permits a terminal 100 accommodated in the vCPE 310 to connect to the vCPE 310 from outside the home and permits the other vCPE 310 to connect to the vCPE 310.

The control unit 430 controls the entirety of the other party vCPE 310B. For example, the control unit 313 is an electronic circuit such as a CPU or an MPU and functions as various processing units as various programs run. The control unit 430 includes a subscriber information acquisition unit 431, a connection determination unit 432, a segment setting unit 433, and an issuance unit 434.

The subscriber information acquisition unit 431 acquires the identification information of the subscriber terminal 100A that connects to the other party vCPE 310B based on the inquiry from the other party vCPE 310B. The subscriber information acquisition unit 431 acquires the MAC address of the subscriber terminal 100A.

The connection determination unit 432 determines whether a connection between the other party terminal 100B and the other party vCPE 310B and a connection between the subscriber terminal 100A and the other party vCPE 310B are to be established through the same network segment based on the connection permission conditions in the other party vCPE 310B and the subscriber terminal 100A. The connection determination unit 432 determines the network segment based on the terminal information table 421 and the vCPE management table 422.

Specifically, the connection determination unit 432 makes a first determination as to whether the subscriber ID of the connecting subscriber terminal 100A is a subscriber ID from which connections are permitted by the other party vCPE 310B that has made the inquiry. Further, the connection determination unit 432 makes a second determination as to whether the other party vCPE 310B that has made the inquiry is a vCPE 310 from which connections are permitted by the connecting subscriber terminal 100A.

First, the case where the subscriber ID of the subscriber terminal 100A is a subscriber ID from which connections are permitted by the other party vCPE 310B and the other party vCPE 310B is vCPE 310 from which connections are permitted by the subscriber terminal 100A will be described.

The case where the IP address of the other party vCPE 310B is "IP addr 2", the MAC address of the subscriber terminal 100A is "MAC addr 1", and the subscriber ID of the subscriber terminal 100A is "ID 1" will be described as an example. In this case, the CPE management table (see FIG. 10) indicates that the subscriber ID "ID1" of the subscriber terminal 100A is a subscriber ID from which connections are permitted by the other party vCPE 310B with the IP address "IP addr 2". The terminal information table (see FIG. 9) indicates that the other party vCPE 310B with the IP address "IP addr 2" is a vCPE 310 from which connections are permitted by the subscriber terminal 100A with the MAC address "MAC addr 1".

In this case, the connection determination unit 432 determines that a connection between the other party terminal 100B and the other party vCPE 310B and a connection between the subscriber terminal 100A and the other party vCPE 310B are to be established through the same network segment.

On the other hand, the case where the subscriber ID of the subscriber terminal 100A is not a subscriber ID from which connections are permitted by the other party vCPE 310B or the other party vCPE 310B is not a vCPE 310 from which connections are permitted by the subscriber terminal 100A will be described.

The case where the IP address of the other party vCPE 310B is "IP addr 2", the MAC address of the subscriber terminal 100A is "MAC addr 2", and the subscriber ID of the subscriber terminal 100A is "ID 1" will be described as an example. In this case, the CPE management table (see FIG. 10) indicates that the subscriber ID "ID1" of the subscriber terminal 100A is a subscriber ID from which connections are permitted by the other party vCPE 310B with the IP address "IP addr 2". On the other hand, the terminal information table (see FIG. 9) indicates that the other party vCPE 310B with the IP address "IP addr 2" is not a vCPE 310 from which connections are permitted by the subscriber terminal 100A with the MAC address "MAC addr 2".

Therefore, in this case, the connection determination unit 432 determines that a connection between the other party terminal 100B and the other party vCPE 310B and a connection between the subscriber terminal 100A and the other party vCPE 310B are to be established through different network segments.

The segment setting unit 433 sets network segments for a connection between the other party terminal 100B and the other party vCPE 310B and a connection between the subscriber terminal 100A and the other party vCPE 310B according to the determination of the connection determination unit 432 and notifies the other party vCPE of a VLAN setting instruction.

The issuance unit 434 notifies the other party vCPE 310B of the IP address of the subscriber vCPE 310A to which the subscriber terminal 100A that connects to the other party vCPE 310B belongs.

Configuration of Other Party CPE

Figure 12:
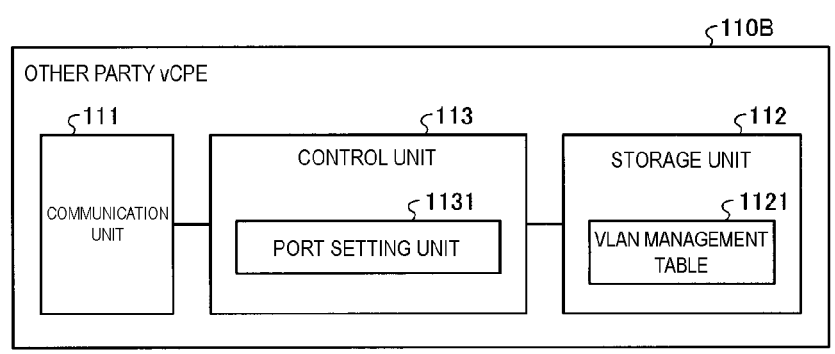
FIG. 12 is a diagram illustrating an example of a configuration of the other party CPE illustrated in FIG. 1.
Figure 13:
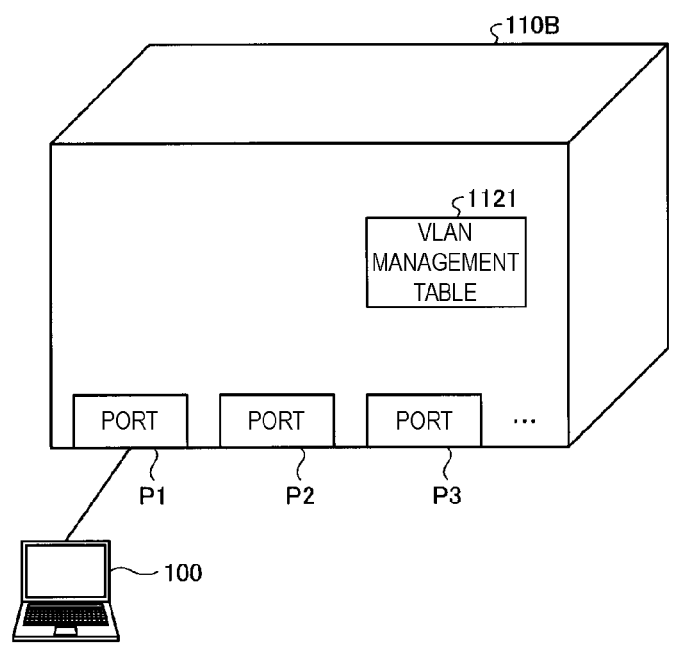
FIG. 13 is a diagram illustrating an outline of the other party CPE illustrated in FIG. 1.

Next, the configuration of the other party CPE 110B will be described. FIG. 12 is a diagram illustrating an example of the configuration of the other party CPE 110B illustrated in FIG. 1. FIG. 13 is a diagram illustrating an outline of the other party CPE illustrated in FIG. 1.

The other party CPE 110B illustrated in FIG. 12 includes a communication unit 111 implemented by a communication interface having various ports P1, P2, and P3 (see FIG. 13), a storage unit 112 implemented by a RAM or a flash memory, and a control unit 113 implemented by a CPU or the like.

The storage unit 111 has a VLAN management table 1121. FIG. 14 is a diagram showing an example of a data structure of the VLAN management table 1121. As shown in FIG. 14, the VLAN management table 1121 has items of a port number, a VLAN number assigned by the other party vCPE 310B, and a MAC address of the connecting terminal 100. The set VLAN information is notified by the other party vCPE 310B using a protocol such as RADIUS.

The control unit 113 has a port setting unit 1131. The port setting unit 1131 allocates the VLAN number allocated by the other party vCPE 310B and the MAC address of the connecting terminal 100 to a corresponding physical port or logical port based on the VLAN management table. For example, when the MAC address of the connecting terminal 100 is "aa:bb:cc:dd:ee:ff", the port setting unit 1131 allocates "aa:bb:cc:dd:ee:ff" to a port with a port number "1" corresponding to a VLAN number "1" allocated by the vCPE 310B.

Processing Procedure of Communication Processing

Figure 15:
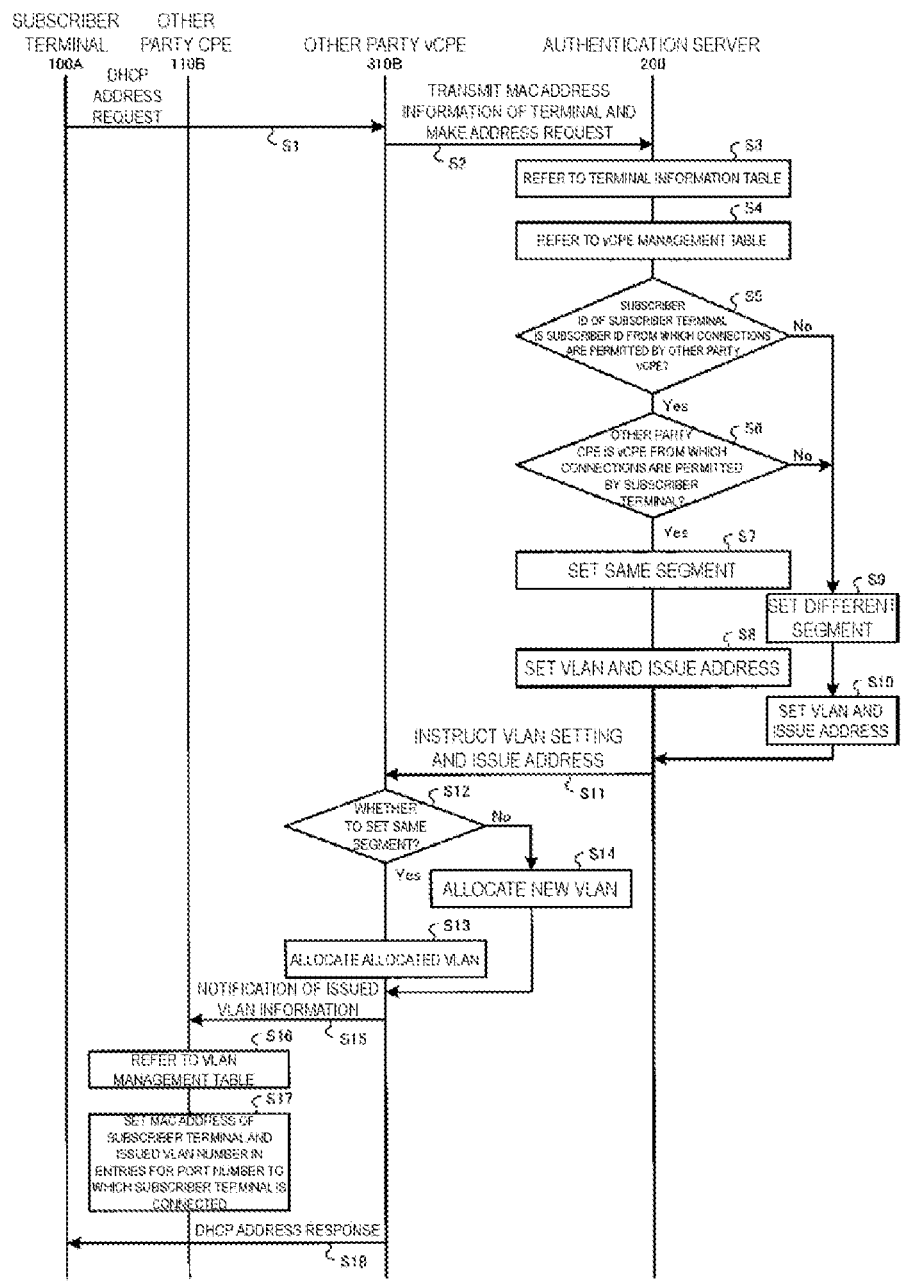
FIG. 15 is a sequence diagram illustrating a processing procedure of communication processing according to the embodiment.

FIG. 15 is a sequence diagram illustrating a processing procedure of communication processing according to the embodiment. As illustrated in FIG. 15, the subscriber terminal 100A transmits a DHCP address request to the other party vCPE 310B when connecting to a home network of the subscriber B who is the other party (step S1). The other party vCPE 310B transmits MAC address information of the subscriber terminal 100A using RADIUS or the like and requests the IP address of a subscriber vCPE to which the subscriber terminal 100A belongs (step S2).

The authentication server 400 refers to the terminal information table and the vCPE management table (steps S3 and S4). Then, the authentication server 400 determines whether the subscriber ID of the connecting subscriber terminal 100A is a subscriber ID from which connections are permitted by the other party vCPE 310B that has made the inquiry (step S5). When determining that the subscriber ID of the connecting subscriber terminal 100A is a subscriber ID from which connections are permitted by the other party vCPE 310B (step S5: Yes), the authentication server 400 determines whether the other party vCPE 310B that has made the inquiry is vCPE 310 from which connections are permitted by the connecting subscriber terminal 100A (step S6).

Then, when determining that the other party vCPE 310B is vCPE 310 from which connections are permitted by the subscriber terminal 100A (step S6: Yes), the authentication server 400 determines that a connection between the other party terminal 100B and the other party vCPE 310B and a connection between the subscriber terminal 100A and the other party vCPE 310B are to be established through the same network segment (step S7). Then, the authentication server 400 instructs the other party vCPE 310B to set the same VLAN for the subscriber terminal 100A as that for the other party terminal 100B and issues the IP address of the subscriber vCPE (steps S8 and S11).

On the other hand, in the following case, the authentication server 400 determines that a connection between the other party terminal 100B and the other party vCPE 310B and a connection between the subscriber terminal 100A and the other party vCPE 310B are to be established through different network segments (step S9). The case mentioned here is that where the authentication server 400 has determined that the subscriber ID of the subscriber terminal 100A is not a subscriber ID from which connections are permitted by the other party vCPE 310B (step S5: No). Alternatively, the case mentioned here is that where the authentication server 400 has determined that the other party vCPE 310B is not vCPE 310 from which connections are permitted by the connecting subscriber terminal 100A (step S6: No). Then, the authentication server 400 instructs the other party vCPE 310B to set, for the subscriber terminal 100A, a different VLAN from that for the other party terminal 100B and issues the IP address of the subscriber vCPE (steps S10 and S11).

The other party vCPE 310B connects the subscriber vCPE 310A to which the terminal 100A of the subscriber A belongs and the other party vCPE 310B through a tunnel. Then, the other party vCPE 310B determines whether the instruction from the authentication server 400 indicates that the subscriber terminal 100A has the same VLAN (network segment) setting as that of the other party terminal 100B (step S12).

When determining that the instruction from the authentication server 400 indicates that the subscriber terminal 100A has the same VLAN setting as that of the other party terminal 100B (step S12: Yes), the other party vCPE 310B allocates an allocated VLAN, which has been allocated to the other party terminal 100B, to the subscriber terminal 100A (step S13). On the other hand, when determining that the instruction from the authentication server 400 does not indicate that the subscriber terminal 100A has the same VLAN setting as that of the other party terminal 100B (step S12: No), the other party vCPE 310B allocates a new VLAN, which is different from the VLAN allocated to the other party terminal 100B, to the subscriber terminal 100A (step S14).

When receiving a notification of the issued VLAN information from the other party vCPE 310B (step S15), the other party CPE 110B refers to the VLAN management table (step S16) and sets the MAC address of the subscriber terminal 100A and the issued VLAN number in entries for the port number of a port to which the subscriber terminal 110A is connected by referring to the VLAN management table (step S17). Further, the other party vCPE 310B provides a DHCP address response to the subscriber terminal 100A (step S18).

Effects of Embodiment

When a subscriber terminal 100A connects to the other party vCPE 310B, the communication system 1 checks a network connection policy of the subscriber terminal 100A for the other party vCPE 310B and a network connection policy of the other party vCPE 310B for the subscriber terminal 100A as described above.

Then, in the following case, the communication system 1 dynamically sets different VLANs for a connection between the other party terminal 100B and the other party vCPE 310B and a connection between the subscriber terminal 100A and the other party vCPE 310B such that the network can be divided to ensure security. The case mentioned here is that where the subscriber ID of the subscriber terminal 100A is not a subscriber ID from which connections are permitted by the other party vCPE 310B or the other party vCPE 310B is not a vCPE 310 from which connections are permitted by the subscriber terminal 100A.

On the other hand, in the following case, the communication system 1 dynamically sets the same VLAN for a connection between the other party terminal 100B and the other party vCPE 310B and a connection between the subscriber terminal 100A and the other party vCPE 310B. The case mentioned here is that where the subscriber ID of the subscriber terminal 100A is a subscriber ID from which connections are permitted by the other party vCPE 310B and the other party vCPE 310B is a vCPE 310 from which connections are permitted by the subscriber terminal 100A.

As a result, when a subscriber terminal connects to the other party vCPE, the communication system 1 can flexibly change the connection relationship between the subscriber terminal and the other party terminal which connects to the other party vCPE. That is, the communication system 1 enables setting of connection policies in units of subscribers of terminals 100 or in units of pieces of vCPE, thereby enabling flexible setting of network connectivity.

Also, the communication system 1 connects a network and a terminal through a VLAN only when the connection is permitted therebetween, thereby making it possible to maintain the utilization and connectivity of equipment of a network to which a terminal connects while limiting the connectivity with the other party terminal which connects to the same network.

First Modification

A first modification of the embodiment will be described for the case where the other party vCPE 310B' rather than the authentication server 400 determines and sets a connection between the other party terminal 100B and the other party vCPE 310B and a connection between the subscriber terminal 100A and the other party vCPE 310B. A communication system according to the first modification includes the other party vCPE 310B' and an authentication server 400' instead of the other party vCPE 310B and the authentication server 400 of the communication system 1.

Configuration of Other Party vCPE

Figure 16:
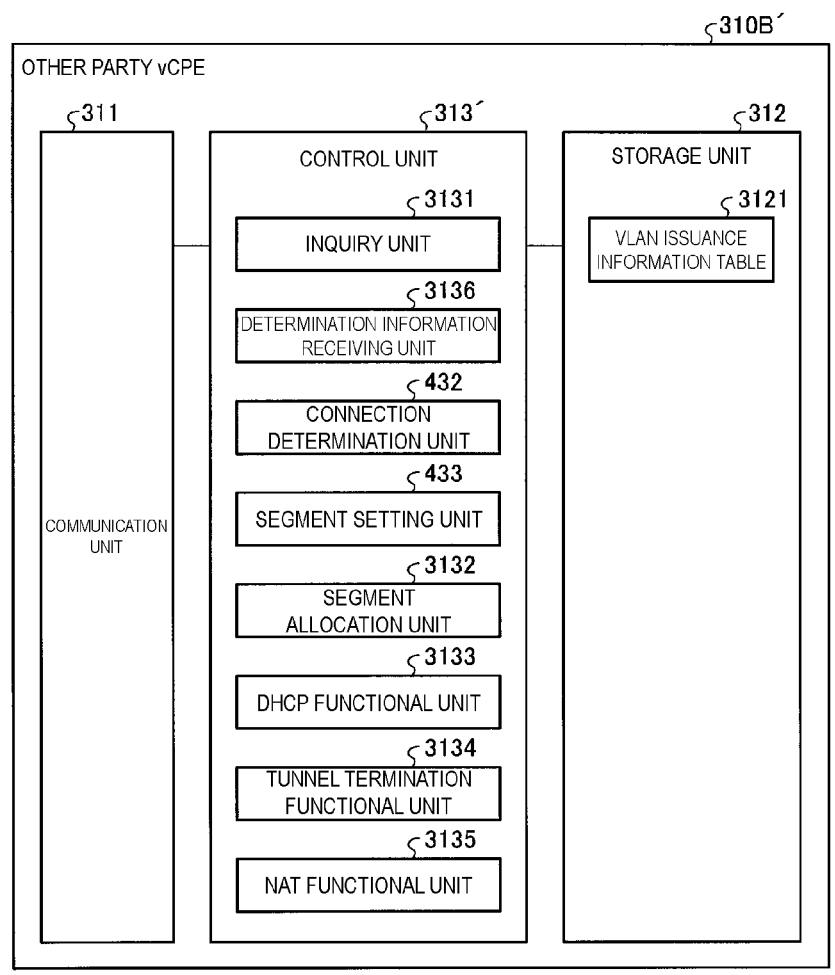
FIG. 16 is a diagram illustrating an example of a configuration of the other party vCPE in a first modification of a first embodiment.

FIG. 16 is a diagram illustrating an example of the configuration of the other party vCPE 310B' in the first modification of the first embodiment. As illustrated in FIG. 16, the other party vCPE 310B' includes a control unit 313' as compared to the other party vCPE 310B illustrated in FIG. 6. The control unit 313' further includes a determination information receiving unit 3136, a connection determination unit 432, and a segment setting unit 433 as compared to the control unit 313.

The determination information receiving unit 3136 receives information necessary for connection determination from the authentication server 400. That is, the determination information receiving unit 3136 receives the IP address of a subscriber vCPE, a subscriber ID, and the IP address of the other party vCPE from which connections are permitted by the subscriber terminal 100A, which correspond to the MAC address of the subscriber terminal 100A. Then, the determination information receiving unit 3136 receives subscriber IDs from which connections are permitted by the other party vCPE 310B'. Specifically, the determination information receiving unit 3136 receives entries in the terminal information table (see FIG. 9) corresponding to the MAC address of the subscriber terminal 100A and an entry in the vCPE management table (see FIG. 10) corresponding to the IP address of the other party vCPE 310B which has made the inquiry from the authentication server 400.

Then, the connection determination unit 432 determines whether a connection between the other party terminal 100B and the other party vCPE 310B and a connection between the subscriber terminal 100A and the other party vCPE 310B are to be established through the same network segment based on the information received by the determination information receiving unit 3136. The segment setting unit 433 instructs the segment allocation unit 3132 to set VLANs for a connection between the other party terminal 100B and the other party vCPE 310B and a connection between the subscriber terminal 100A and the other party vCPE 310B according to the determination of the connection determination unit 432.

Configuration of Authentication Server

Figure 17:
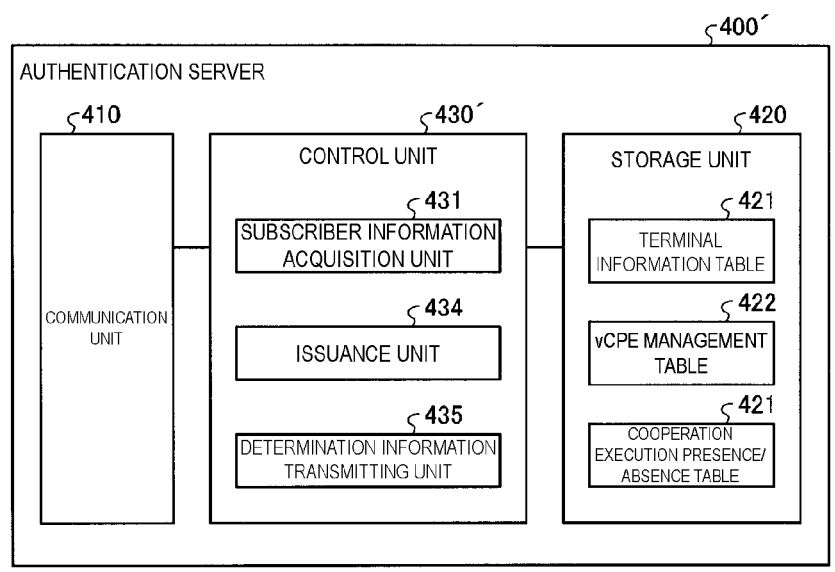
FIG. 17 is a diagram illustrating an example of a configuration of an authentication server in the first modification of the first embodiment.

FIG. 17 is a diagram illustrating an example of the configuration of the authentication server 400' in the first modification of the first embodiment. As illustrated in FIG. 17, the authentication server 400' includes a control unit 430' as compared to the authentication server 400 illustrated in FIG. 8. The control unit 430' includes a subscriber information acquisition unit 431, a determination information transmitting unit 435, and an issuance unit 434.

The determination information transmitting unit 435 receives information necessary for connection determination to the other party vCPE 310B'. That is, the determination information transmitting unit 435 transmits the IP address of a subscriber vCPE, a subscriber ID, and the IP address of the other party vCPE from which connections are permitted by the subscriber terminal 100A, which correspond to the MAC address of the subscriber terminal 100A. Then, the determination information receiving unit 3136 transmits subscriber IDs from which connections are permitted by the other party vCPE 310B'. Specifically, the determination information transmitting unit 435 transmits entries in the terminal information table (see FIG. 9) corresponding to the MAC address of the subscriber terminal 100A and an entry in the vCPE management table (see FIG. 10) corresponding to the IP address of the other party vCPE 310B which has made the inquiry to the other party vCPE 310B'.

Processing Procedure of Communication Processing

Figure 18:
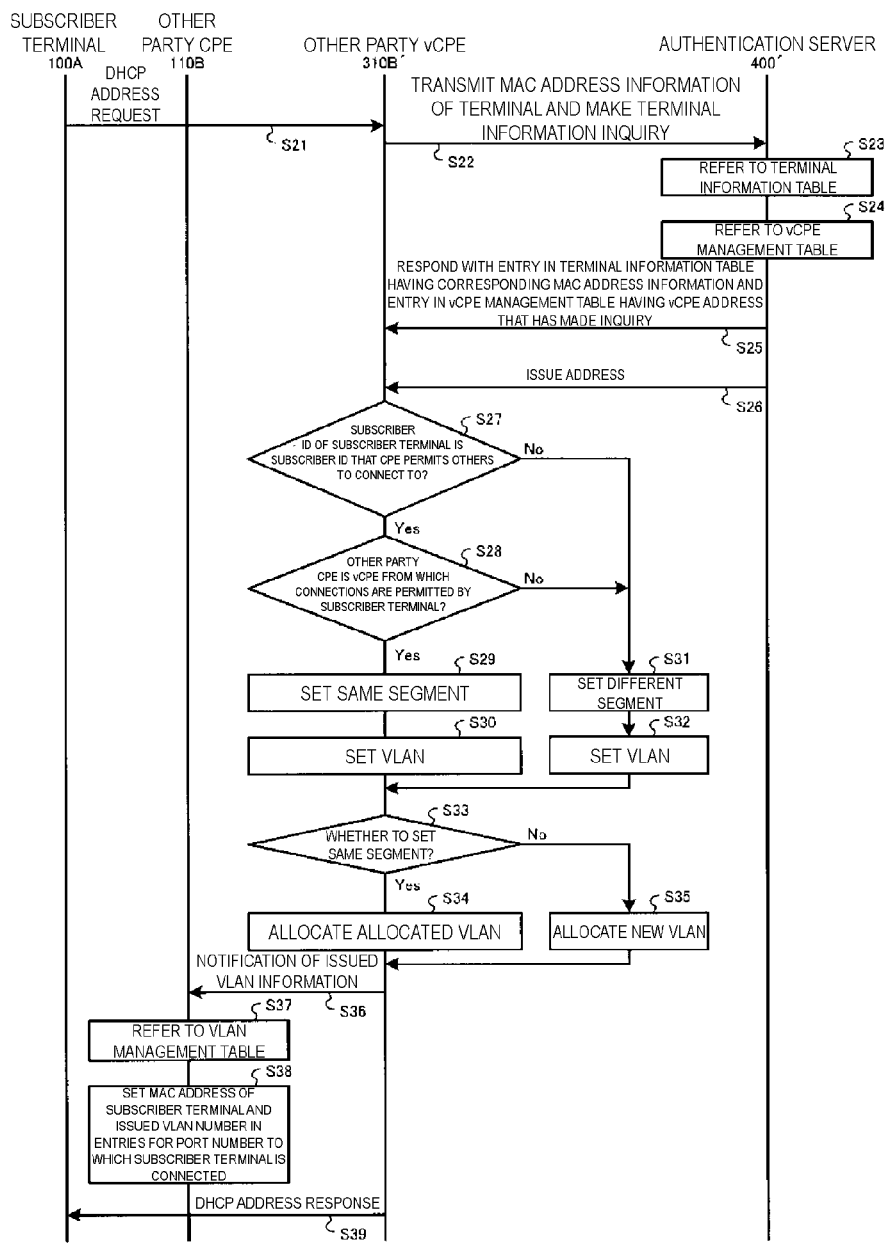
FIG. 18 is a sequence diagram illustrating a processing procedure of communication processing according to the first modification of the embodiment.

FIG. 18 is a sequence diagram illustrating a processing procedure of communication processing according to the first modification of the embodiment. Steps S21 to S24 illustrated in FIG. 18 are the same processes as steps S1 to S4 illustrated in FIG. 15. The authentication server 400 transmits entries in the terminal information table (see FIG. 9) corresponding to the MAC address of the subscriber terminal 100A and an entry in the vCPE management table (see FIG. 10) corresponding to the IP address of the other party vCPE 310B which has made the inquiry to the other party vCPE 310B' (step S25). Then, the authentication server 400 issues the IP address of the subscriber vCPE for the subscriber terminal 100A to the other party vCPE 310B (step S26).

The other party vCPE 310B' performs connection determination and segment setting based on information received from the authentication server 400. In steps S27 to S32, the other party vCPE 310B' performs the same processes as steps S5 to S10 performed by the authentication server 400 illustrated in FIG. 15. Steps S33 to S39 are the same processes as steps S12 to S18 illustrated in FIG. 15.

The other party vCPE 310B' may set a network segment for the subscriber terminal 100A as in the first modification.

Second Modification

A second modification of the embodiment will be described for the case where the other party CPE 110B' determines and sets a connection between the other party terminal 100B and the other party vCPE 310B and a connection between the subscriber terminal 100A and the other party vCPE 310B. A communication system according to the second modification includes the other party CPE 110', the other party vCPE 310B, and an authentication server 400' instead of the other party 110B, the other party vCPE 310B, and the authentication server 400 of the communication system 1.

Configuration of Other Party vCPE

Figure 19:
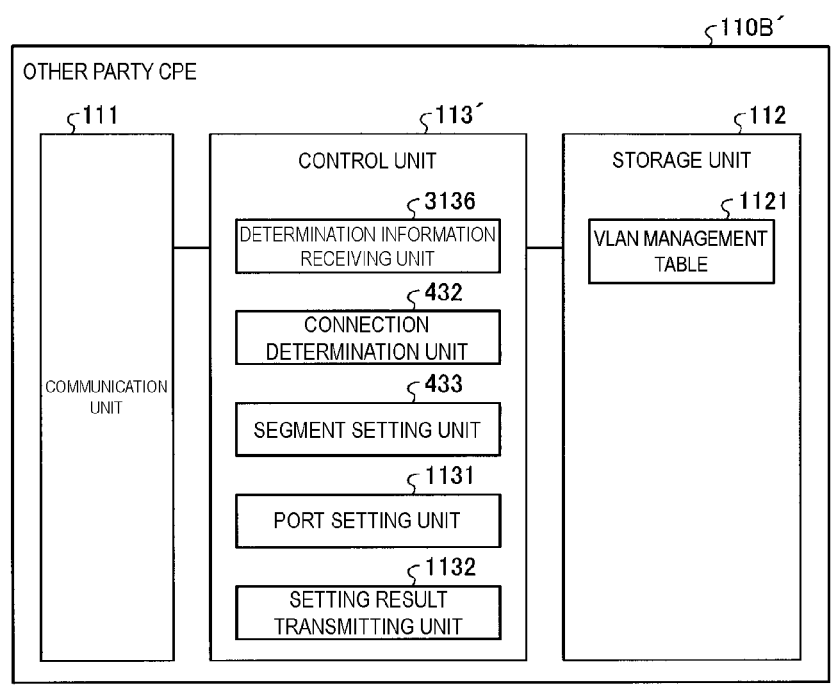
FIG. 19 is a diagram illustrating an example of a configuration of the other party CPE in a second modification of the first embodiment.

FIG. 19 is a diagram illustrating an example of the configuration of the other party CPE 110B' in the second modification of the first embodiment. As illustrated in FIG. 19, the other party CPE 110B' includes a control unit 113' as compared to the other party CPE 110B illustrated in FIG. 12. The control unit 113' further includes a determination information receiving unit 3136, a connection determination unit 432, a segment setting unit 433, and a setting result transmitting unit 1132 that transmits a segment network setting instruction issued by the segment setting unit 433 to the other party vCPE 310B, as compared to the control unit 113.

Flow of Communication Processing

Figure 20:
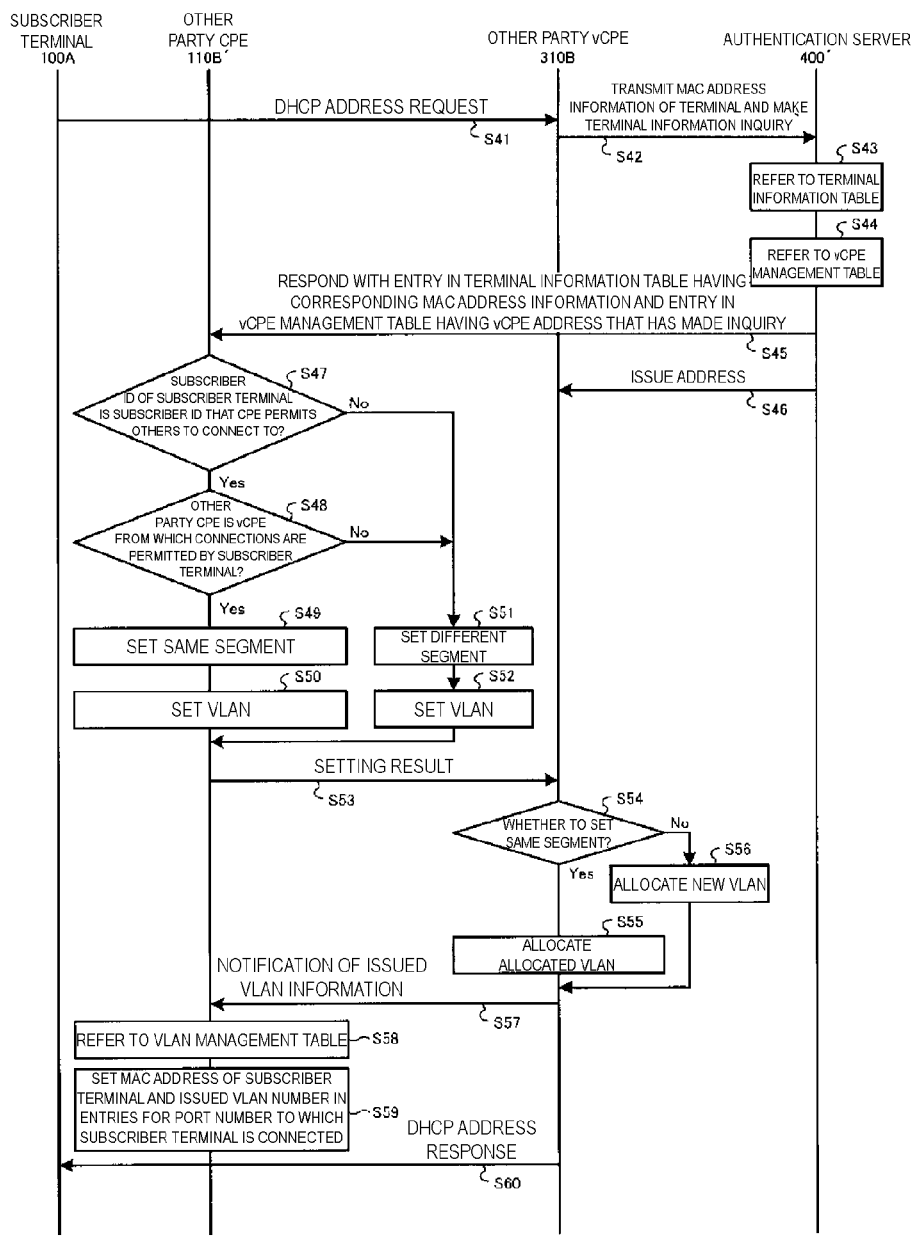
FIG. 20 is a sequence diagram illustrating a processing procedure of communication processing according to the second modification of the embodiment.

FIG. 20 is a sequence diagram illustrating a processing procedure of communication processing according to the second modification of the embodiment. Steps S41 to S44 illustrated in FIG. 20 are the same processes as steps S1 to S4 illustrated in FIG. 15. The authentication server 400 transmits entries in the terminal information table (see FIG. 9) corresponding to the MAC address of the subscriber terminal 100A and an entry in the vCPE management table (see FIG. 10) corresponding to the IP address of the other party vCPE 310B which has made the inquiry to the other party CPE 110B' (step S45). Step S46 is the same process as step S26 illustrated in FIG. 18.

Then, the other party 110B' performs connection determination and segment setting based on information received from the authentication server 400. In steps S47 to S52, the other party 110B' performs the same processes as steps S5 to S10 performed by the authentication server 400 illustrated in FIG. 15. Then, the other party 110B' transmits a setting result to the other party vCPE 310B (step S53). Steps S54 to S60 are the same processes as steps S12 to S18 illustrated in FIG. 15.

The other party CPE 110' may set a network segment for the subscriber terminal 100A as in the second modification.

About Variations

In the above examples, a MAC address is used as terminal authentication information in the authentication server 400 or 400', but this is just an example. Authentication using a certificate or SIM information according to an EAP-SIM authentication method may be performed in addition to authentication using a MAC address.

In Case of Certificate

In the case of using a certificate, certificate authentication is used for authentication in the authentication server 400 or 400'. Specifically, the authentication server 400 or 400' manages sets of certificate information of a terminal and vCPE accommodating the terminal and performs authentication using the managed information. The certificate needs to be acquired in advance. For example, the certificate is acquired when the subscriber connects to the home network.

The certificate may be used for MAC address checking to check whether an address has been issued for the vCPE 310 or the MAC address may be used as it is or MAC address checking may not be performed.

In Case of SIM Authentication

In the case of SIM authentication, the EAP-SIM authentication method is used for authentication in the authentication server 400 or 400'. Specifically, the authentication server 400 or 400' manages sets of SIM information of a terminal and vCPE accommodating the terminal and performs authentication using the managed information.

SIM authentication may be used for MAC address checking to check whether or not an address has been issued for the vCPE 310 or the MAC address may be used as it is or MAC address checking may not be performed.

About Registration of MAC Address in Authentication Server

MAC address registration in the authentication server 400 or 400' may be performed only for predetermined terminals 100 to reduce the number of items of information registered in the authentication server 400.

About Connection Approval in Out-of-home Network

The communication system 1 may have a connection approval function such that the owner of a network which is a connection destination can give permission to use the network.

As an example, in case of having the communication system connection approval function, the owner of a network which is a connection destination chooses whether to permit connections via a Web interface. When connections are not permitted, the vCPE 310 stops inquiring the authentication server 400 or 400'. Alternatively, the vCPE 310 only inquires the authentication server 400 or 400' and the inquiry result is discarded. When connections are permitted, the same operation as that of the sequence of the embodiment (or the first modification or second modification of the embodiment) is performed.

About Setting Regarding Use of Functions

The communication system 1 may have a function that allows a connection service user to choose whether to use a function of connecting to a home network from outside the home.

In an example where the communication system 1 has the function, the connection service user chooses whether to use the function via a Web interface. When the function is not used, settings are made not to perform inquiry to the authentication server 400 or 400' and MAC address registration in the authentication server 400 or 400' and terminal information of a terminal connecting to the vCPE 310 is deleted from the authentication server 400 or 400'. Alternatively, the authentication server 400 is set not to respond to the vCPE 310. Setting of the cooperation execution presence/absence table shown in FIG. 11 is made as an example of such a setting. For example, the first row of the table shown in FIG. 11 indicates that there is an out-of-home connection of a terminal belonging to a vCPE with IP address 1 and the vCPE with the IP address 1 does not permit connections from other vCPE.

System Configuration and the Like

The components of the devices illustrated are functionally conceptual and are not necessarily physically configured as illustrated. That is, the specific modes of dispersion and integration of the devices are not limited to those illustrated and all or some of the devices can be configured such that they are functionally or physically dispersed or integrated in any units according to various loads, use conditions, or the like. Further, all or any part of the processing functions performed in the devices may be implemented by a CPU and a program to be interpreted/performed by the CPU or may be implemented as hardware by a wired logic.

All or some of processes described as being performed automatically among the processes described in the embodiments may be performed manually or all or some of processes described as being performed manually may be performed automatically according to a known method. The processing procedures, the control procedures, the specific names, and information including various data and parameters described in the specification or shown in the drawings may be freely changed except for specified cases.

Program

Figure 21:
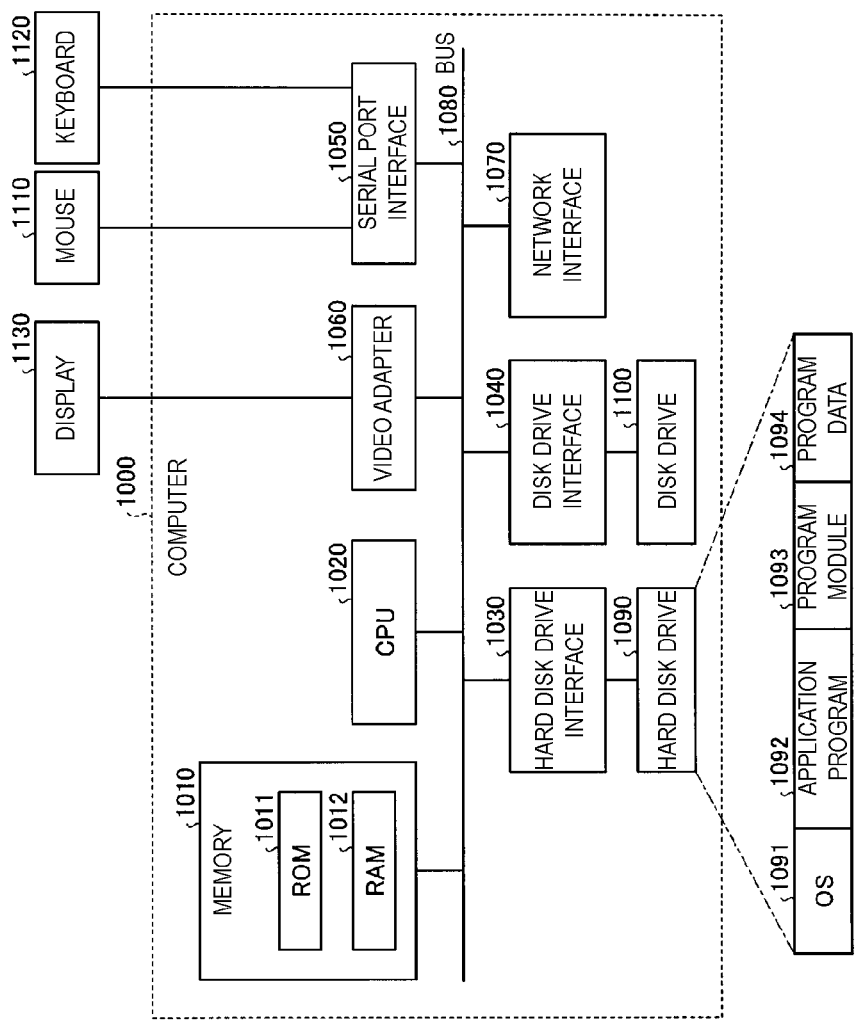
FIG. 21 is a diagram illustrating an example of a computer that implements vCPE, vCPE, and an authentication server by executing a program.

FIG. 21 is a diagram illustrating an example of a computer that impements the CPE 110, the vCPE 310, and the authentication server 400 by executing a program. The computer 1000 has, for example, a memory 1010 and a CPU 1020. The computer 1000 has a hard disk drive interface 1030, a disk drive interface 1040, a serial port interface 1050, a video adapter 1060, and a network interface 1070. These components are connected by a bus 1080.

The memory 1010 includes a Read Only Memory (ROM) 1011 and a RAM 1012. The ROM 1011 stores, for example, a boot program such as a Basic Input Output System (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected, for example, to a mouse 1110 and a keyboard 1120. The video adapter 1060 is connected, for example, to a display 1130.

The hard disk drive 1090 stores, for example, an Operating System (OS) 1091, an application program 1092, a program module 1093, and program data 1094. That is, a program that defines each processing of the CPE 110, the vCPE 310, and the authentication server 400 is implemented as the program module 1093 in which codes executable by the computer are described. The program module 1093 is stored, for example, in the hard disk drive 1090. For example, a program module 1093 for executing the same processing as the functional configuration of each piece of the CPE 110, the vCPE 310, and the authentication server 400 is stored in the hard disk drive 1090. The hard disk drive 1090 may be replaced by a Solid State Drive (SSD).

Setting data used in the processing of the embodiments described above is stored as the program data 1094, for example, in the memory 1010 or the hard disk drive 1090. The CPU 1020 reads the program module 1093 and the program data 1094 stored in the memory 1010 and the hard disk drive 1090 into the RAM 1012 as needed and executes them.

The program module 1093 and the program data 1094 are not limited to being stored in the hard disk drive 1090. For example, the program module 1093 and the program data 1094 may be stored in a removable storage medium and read by the CPU 1020 via the disk drive 1100 or the like. Alternatively, the program module 1093 and the program data 1094 may be stored in another computer connected via a network (such as a LAN or a wide Area Network (WAN)). Then, the program module 1093 and the program data 1094 may be read from the other computer by the CPU 1020 via the network interface 1070.

Although embodiments to which the invention made by the inventor is applied have been described, the present invention is not limited by the description and the drawings that form a part of the disclosure of the present invention according to the present embodiments. That is, other embodiments, examples, operation techniques, and the like that those skilled in the art implement based on the present embodiments are all included in the scope of the present invention.

REFERENCE SIGNS LIST

1 Communication system
100A Subscriber terminal
100B Other party terminal
110A Subscriber CPE
110B, 110B' Other party CPE
111, 311, 410 Communication unit
112, 312, 420 Storage unit
113, 113', 313, 313', 430, 430' Control unit
200A-200C Router
310A Subscriber vCPE
310B, 310B' Other party vCPE
400, 410' Authentication server
421 Terminal information table
422 vCPE management table
423 Cooperation execution presence/absence table
431 Subscriber information acquisition unit
432 Connection determination unit
433 Segment setting unit
434 Issuance unit
435 Determination information transmitting unit
1121 VLAN management table
1131 Port setting unit
1132 Determination result transmitting unit
3121 VLAN issuance information table
3131 Inquiry unit
3132 Segment allocation unit
3133 DHCP functional unit
3134 Tunnel termination functional unit
3135 NAT functional unit
3136 Control information receiving unit

The invention claimed is:

1. A communication system includes first virtual Customer Premise Equipment (vCPE) to which a first terminal belongs, second vCPE to which a second terminal connects, and an authentication server, the communication system comprising:
 a determiner configured to determine, when the first terminal connects to the second vCPE, whether a connection between the second terminal and the second vCPE and a connection between the first terminal and the second vCPE are to be established through an identical network segment based on connection permission conditions of the second vCPE and the first terminal, wherein
 the second vCPE includes:
  a connector configured to establish, if the first terminal is registered in the authentication server, a tunnel connection with the first vCPE based on an address of the first vCPE notified by the authentication server, and
  an allocator configured to:
   allocate, if a connection between the second terminal and the second vCPE and a connection between the first terminal and the second vCPE are determined to establish through different network segment, a network segment different from a network segment allocated to the second terminal to the first terminal, and allocate, if a connection between the second terminal and the second vCPE and a connection between the first terminal and the second vCPE are determined to establish through an identical network segment, a network segment allocated to the second terminal to the first terminal.

2. The communication system according to claim 1, wherein the allocator is configured to allocate, if a connection between the second terminal and the second vCPE and a connection between the first terminal and the second vCPE are determined to establish through different network segment, a VLAN different from a VLAN allocated to the second terminal to the first terminal and allocate, if a connection between the second terminal and the second vCPE and a connection between the first terminal and the second vCPE are determined to establish through an identical network segment, a VLAN allocated to the second terminal to the first terminal.

3. The communication system according to claim 2, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and the determiner is further configured to determine, based on the terminal information and the vCPE management information, whether a connection between the second terminal and the second vCPE and a connection between the first terminal and the second vCPE are to be established through the same network segment.

4. The communication system according to claim 1, wherein the allocator is configured to allocate, if a connection between the second terminal and the second vCPE and a connection between the first terminal and the second vCPE are determined to establish through different network segment, a tunnel different from a tunnel allocated to the second terminal to the first terminal and allocate, if a connection between the second terminal and the second vCPE and a connection between the first terminal and the second vCPE are determined to establish through an identical network segment, a tunnel allocated to the second terminal to the first terminal.

5. The communication system according to claim 4, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and the determiner is further configured to determine, based on the terminal information and the vCPE management information, whether a connection between the second terminal and the second vCPE and a connection between the first terminal and the second vCPE are to be established through the same network segment.

6. The communication system according to claim 1, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and the determiner is further configured to determine, based on the terminal information and the vCPE management information, whether a connection between the second terminal and the second vCPE and a connection between the first terminal and the second vCPE are to be established through the same network segment.

7. The communication system according to claim 6, wherein the determiner is further configured to:

determine, based on the terminal information and the vCPE management information, if a subscriber ID of the first terminal is a subscriber ID from which connection is permitted by the second vCPE and the second vCPE is a vCPE from which connection is permitted by the first terminal, that a connection between the second terminal and the second vCPE and a connection between the first terminal and the second vCPE are to be established through an identical network segment and determine, if the subscriber ID of the first terminal is not a subscriber ID from which connection is permitted by the second vCPE or the second vCPE is not a vCPE from which connection is permitted by the first terminal, that a connection between the second terminal and the second vCPE and a connection between the first terminal and the second vCPE are to be established through different network segment.

8. A communication method performed by a communication system including first virtual Customer Premise Equipment (vCPE) to which a first terminal belongs, second vCPE to which a second terminal connects, and an authentication server, the communication method comprising:

when the first terminal connects to the second vCPE, determining, by a determiner, whether a connection between the second terminal and the second vCPE and a connection between the first terminal and the second vCPE are to be established through an identical network segment based on connection permission conditions of the second vCPE and the first terminal;

establishing, by a connector in the second vCPE, if the first terminal is registered in the authentication server, a tunnel connection with the first vCPE based on an address of the first vCPE notified by the authentication server;

allocating, by an allocator in the second vCPE, if a connection between the second terminal and the second vCPE and a connection between the first terminal and the second vCPE are determined to establish through different network segment, a network segment different from a network segment allocated to the second terminal to the first terminal; and allocating, by the allocator in the second vCPE, if a connection between the second terminal and the second vCPE and a connection between the first terminal and the second vCPE are determined to establish through an identical network segment, a network segment allocated to the second terminal to the first terminal.

9. The communication method according to claim 8, wherein the allocator is configured to allocate, if a connection between the second terminal and the second vCPE and a connection between the first terminal and the second vCPE are determined to establish through different network segment, a VLAN different from a VLAN allocated to the second terminal to the first terminal and allocate, if a connection between the second terminal and the second vCPE and a connection between the first terminal and the second vCPE are determined to establish through an identical network segment, a VLAN allocated to the second terminal to the first terminal.

10. The communication method according to claim 9, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and
the determiner is further configured to determine, based on the terminal information and the vCPE management information, whether a connection between the second terminal and the second vCPE and a connection between the first terminal and the second vCPE are to be established through the same network segment.

11. The communication method according to claim 8, wherein the allocator is configured to allocate, if a connection between the second terminal and the second vCPE and a connection between the first terminal and the second vCPE are determined to establish through different network segment, a tunnel different from a tunnel allocated to the second terminal to the first terminal and allocate, if a connection between the second terminal and the second vCPE and a connection between the first terminal and the second vCPE are determined to establish through an identical network segment, a tunnel allocated to the second terminal to the first terminal.

12. The communication method according to claim 11, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and
the determiner is further configured to determine, based on the terminal information and the vCPE management information, whether a connection between the second terminal and the second vCPE and a connection between the first terminal and the second vCPE are to be established through the same network segment.

13. The communication method according to claim 8, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and
the determiner is further configured to determine, based on the terminal information and the vCPE management information, whether a connection between the second terminal and the second vCPE and a connection between the first terminal and the second vCPE are to be established through the same network segment.

14. The communication method according to claim 13, wherein the determiner is further configured to:
determine, based on the terminal information and the vCPE management information, if a subscriber ID of the first terminal is a subscriber ID from which connection is permitted by the second vCPE and the second vCPE is a vCPE from which connection is permitted by the first terminal, that a connection between the second terminal and the second vCPE and a connection between the first terminal and the second vCPE are to be established through an identical network segment and
determine, if the subscriber ID of the first terminal is not a subscriber ID from which connection is permitted by the second vCPE or the second vCPE is not a vCPE from which connection is permitted by the first terminal, that a connection between the second terminal and the second vCPE and a connection between the first terminal and the second vCPE are to be established through different network segment.

15. A system for communications including first virtual Customer Premise Equipment (vCPE) to which a first terminal belongs, second vCPE to which a second terminal connects, and an authentication server, the system comprises:
a processor; and
a memory storing computer-executable instructions that when executed by the processor cause the system to:
when the first terminal connects to the second vCPE, determining, by a determiner, whether a connection between the second terminal and the second vCPE and a connection between the first terminal and the second vCPE are to be established through an identical network segment based on connection permission conditions of the second vCPE and the first terminal;
establishing, by a connector in the second vCPE, if the first terminal is registered in the authentication server, a tunnel connection with the first vCPE based on an address of the first vCPE notified by the authentication server;
allocating, by an allocator in the second vCPE, if a connection between the second terminal and the second vCPE and a connection between the first terminal and the second vCPE are determined to establish through different network segment, a network segment different from a network segment allocated to the second terminal to the first terminal; and
allocating, by the allocator in the second vCPE, if a connection between the second terminal and the second vCPE and a connection between the first terminal and the second vCPE are determined to establish through an identical network segment, a network segment allocated to the second terminal to the first terminal.

16. The system of claim 15, wherein the allocator is configured to allocate, if a connection between the second terminal and the second vCPE and a connection between the first terminal and the second vCPE are determined to establish through different network segment, a VLAN different from a VLAN allocated to the second terminal to the first terminal and allocate, if a connection between the second terminal and the second vCPE and a connection between the first terminal and the second vCPE are determined to establish through an identical network segment, a VLAN allocated to the second terminal to the first terminal.

17. The system of claim 16, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and the determiner is further configured to determine, based on the terminal information and the vCPE management information, whether a connection between the second terminal and the second vCPE and a connection between the first terminal and the second vCPE are to be established through the same network segment.

18. The system of claim 15, wherein the allocator is configured to allocate, if a connection between the second terminal and the second vCPE and a connection between the first terminal and the second vCPE are determined to establish through different network segment, a tunnel different from a tunnel allocated to the second terminal to the first terminal and allocate, if a connection between the second terminal and the second vCPE and a connection between the first terminal and the second vCPE are determined to establish through an identical network segment, a tunnel allocated to the second terminal to the first terminal.

19. The system of claim 15, wherein the authentication server includes a storage configured to store terminal information in which a MAC address of a terminal, identification information of a vCPE accommodating the terminal, a subscriber ID of the terminal, and identification information of a vCPE from which connection is permitted by the terminal are associated with each other and vCPE management information in which identification information of the vCPE and a subscriber ID from which connection is permitted by the vCPE are associated with each other, and the determiner is further configured to determine, based on the terminal information and the vCPE management information, whether a connection between the second terminal and the second vCPE and a connection between the first terminal and the second vCPE are to be established through the same network segment.

20. The system of claim 19, wherein the determiner is further configured to:

determine, based on the terminal information and the vCPE management information, if a subscriber ID of the first terminal is a subscriber ID from which connection is permitted by the second vCPE and the second vCPE is a vCPE from which connection is permitted by the first terminal, that a connection between the second terminal and the second vCPE and a connection between the first terminal and the second vCPE are to be established through an identical network segment and determine, if the subscriber ID of the first terminal is not a subscriber ID from which connection is permitted by the second vCPE or the second vCPE is not a vCPE from which connection is permitted by the first terminal, that a connection between the second terminal and the second vCPE and a connection between the first terminal and the second vCPE are to be established through different network segment.

* * * * *